United States Patent Office 2,764,552
Patented Sept. 25, 1956

2,764,552
FERROMAGNETIC MATERIALS

Sidney Ernest Buckley and Douglas Hiley Owen, London, England, assignors to International Standard Electric Corporation, New York, N. Y.

No Drawing. Application January 29, 1953,
Serial No. 334,075

Claims priority, application Great Britain
February 22, 1952

4 Claims. (Cl. 252—62.5)

This invention relates to magnetic materials of the kind generally known as mixed ferrites. A ferrite consists of a ferromagnetic spinel type material of the general formula $XOFe_2O_3$ where X is a divalent metal. A mixed ferrite consists of a solid solution of two or more such ferrites.

In British Patent 683,722 to D. H. Owen, published December 3, 1952, there has been proposed a process for manufacturing a ferro-magnetic spinel type heterogeneous material consisting of mixed oxides with the addition of a small proportion of either kaolin, silica or kieselguhr which mixture is subjected to a heat treatment at a temperature lying between 1000° C. and 1400° C.

It is an aim of the present invention to provide a ferrite which can be produced with consistent electrical properties at a lower temperature than was previously required.

According to the invention there is provided a magnetic material comprising a mixture of oxides, which themselves combine to form a ferrite, and a low melting point silicate of one of the metals whose oxide forms the ferrite.

The mixture may be, for example, of manganese oxide MnO, zinc oxide ZnO, and ferric oxide $Fe_2O_3$ to which is added either ferrous silicate, manganese silicate, ferrous manganese silicate or all three. In the case of a mixture of nickel oxide NiO, zinc oxide ZnO, and ferric oxide $Fe_2O_3$ there is added either ferrous silicate or nickel silicate or both. These additives are all low melting point silicates, which improve the ease of sintering of the material and assist in producing a more consistently reproducible result than is normal for the known ferrites.

By low melting point silicate is meant a silicate whose melting point is in the region of 1100° C.

In addition a core may be assembled of magnetic materials, made according to the invention, which have temperature coefficients of permeability of opposite sign so that the complete core displays a very low temperature coefficient.

A description will now be given of the preparation and electrical properties of mixtures according to the invention.

The mixtures comprise oxides in the following proportions:

25 molar percent MnO
25 molar percent ZnO
50 molar percent $Fe_2O_3$ together with the addition of ferrous silicate in varying proportions.

The mixtures were all ball milled for 20 hours, pressed at a pressure of 25 tons per square inch, and heat treated for 6 hours at 1150° C. in an atmosphere of commercial nitrogen gas.

The oxides were derived from technical grades of the appropriate oxalates by the decomposition of the oxalates. The electrical properties of various mixtures according to the invention together with those of known mixtures are as follows:

MIXTURES ACCORDING TO THE INVENTION

| Percent Ferrous Silicate By Weight | Heat Treatment | $\mu$ | $K_1$ | $K_2$ | $K_e$ |
|---|---|---|---|---|---|
| 1% | 1,150° C. for 6 hrs | 668 | 33.5 | 1.3 | .67 |
|  |  | 578 | 40 | 1.6 | .70 |
| 1.75% | 1,150° C. for 6 hrs | 640 | 37.3 | 1.53 | .63 |
|  |  | 618 | 29 | 1.6 | .58 |
| 3% | 1,150° C. for 6 hrs | 630 | 21.2 | 1.48 | .75 |
|  |  | 614 | 25.4 | 2.0 | 1.0 |
| 6.6% | 1,150° C. for 6 hrs | 348 | 24 | 1.3 | .33 |
|  |  | 372 | 37.2 | 1.7 | .45 |

KNOWN MIXTURES

| | Heat Treatment | $\mu$ | $K_1$ | $K_2$ | $K_e$ |
|---|---|---|---|---|---|
| No Ferrous Silicate present. | 1,150° C. for 6 hrs | 39.8 | 55 | 7 | .5 |
|  |  | 34.2 | 77.3 | 1.3 | .25 |
|  |  | 21.1 | 60.5 | 1.96 | .1 |
|  |  | 39.2 | 20.75 | 5.74 | .19 |
|  | 1,250° C. for 6 hrs | 615 | 63 | 18.6 | 5.8 |
|  |  | 344 | 138 | 10.9 | 1.0 |
|  |  | 250 | 83 | 8.1 | 1.0 |
|  |  | 710 | 29 | 2.0 | .75 |
|  |  | 542 | 28.2 | 3.23 | .52 |
|  | 1,300° C. for 6 hrs | 485 | 140 | 25.3 | 1 |
|  |  | 425 | 187 | 14.8 | 2 |
|  |  | 460 | 157 | 14.6 | 2 |
|  |  | 730 | 38.6 | 3.05 | .76 |
|  |  | 969 | 51.3 | 4.13 | .92 | where $\mu$ is the permeability, $K_1$ is the residual loss, $K_2$ is the hysteresis loss, and $K_e$ is the eddy current loss of the material.

From these results it can be seen that a considerable control may be exercised over the properties of the mixture and the consistency of reproduction by the addition of varying amounts of silicate, and that for the same heat treatment greatly improved permeability and reduced losses result over those obtained without the silicate.

In order to obtain a core with a low temperature coefficient of permeability a core may be constructed comprising a number of sections each having a different temperature coefficient. For example if a core is composed of four sections from two mixtures which have positive and negative coefficients, the size and number of sections having a positive coefficient can be so arranged with the sections having a negative coefficient that the overall coefficient of the core is very small in practice viz., less than ±45 parts per million per degree C. over a temperature range of from 15° C. to 45° C.

The following properties were measured on two similar sections in the shape of toroidal rings at the permeabilities shown over the temperature range of from 15° C. to 45° C.

The oxide mixture for the sections was prepared in the manner previously described and the first section contained 1% ferrous silicate, while the second section contained no ferrous silicate.

| Percent Ferrous Silicate by weight | Heat Treatment | $\mu$ | $K_1$ | $K_2$ | $K_e$ | Temp. Coefficient, parts per million per ° C. |
|---|---|---|---|---|---|---|
| 1% | 1,150° C. for 6 hours. | 668 | 33.5 | 1.3 | .67 | −11,400 |
| None | 1,250° C. for 6 hours. | 710 | 29 | 2.0 | .75 | +8,400 |

The measurements were made on sections of similar size, and by taking sections which are different, for example by making the second section proportionately larger, two sections may be produced which possess coefficients of similar magnitude but of opposite sign. Cores are generally of more than two sections but the principle may still be applied and by varying the design of the sections an overall low temperature coefficient of permeability may be obtained from two mixtures.

While the principles of the invention have been described above in connection with specific embodiments,

What we claim is:

1. A sintered ferromagnetic material of the spinel type consisting essentially of a mixture of approximately 50 mole per cent $Fe_2O_3$, 25 mole per cent MnO and 25 mole per cent ZnO, together with the addition of a silicate selected from the group consisting of manganous silicate, and ferrous silicate, said silicate being present in an amount between 1 and 6.6 per cent by weight of said mixture of oxides and having a melting point in the region of 1100° C.

2. A ferromagnetic material according to claim 1 wherein said silicate is a ferrous silicate.

3. A ferromagnetic material according to claim 1 wherein said silicate is a ferrous silicate in an amount of approximately 1 per cent by weight of the oxide mixture.

4. A process of making a ferromagnetic material of the spinel type which comprises preparing an intimate mixture of approximately 50 mole per cent of ferric oxide, 25 mole per cent of manganese oxide and 25 mole per cent of zinc oxide with between 1 and 6.6 per cent of ferrous silicate based on the weight of the oxide mixture and sintering said mixture at a temperature not in excess of 1150° C.

References Cited in the file of this patent

UNITED STATES PATENTS

| 2,551,711 | Snoek et al. | May 8, 1951 |
| 2,565,111 | Albers-Schoenberg | Aug. 21, 1951 |

OTHER REFERENCES

Lange's "Handbook of Chemistry," 4th Ed., page 154, 1941.

Mellor: "A Comprehensive Treatise on Inorganic and Theoretical Chemistry," vol. 6, page 905.